(12) United States Patent
Kuang et al.

(10) Patent No.: US 11,715,258 B2
(45) Date of Patent: Aug. 1, 2023

(54) METHOD FOR RECONSTRUCTING A 3D OBJECT BASED ON DYNAMIC GRAPH NETWORK

(71) Applicant: University of Electronic Science and Technology of China, Sichuan (CN)

(72) Inventors: Ping Kuang, Sichuan (CN); Liang Peng, Sichuan (CN); Xiaofeng Gu, Sichuan (CN)

(73) Assignee: UNIVERSITY OF ELECTRONIC SCIENCE AND TECHNOLOGY OF CHINA, Sichuan (CN)

( * ) Notice: Subject to any disclaimer, the term of this patent is extended or adjusted under 35 U.S.C. 154(b) by 162 days.

(21) Appl. No.: 17/243,594

(22) Filed: Apr. 29, 2021

(65) Prior Publication Data

US 2021/0248812 A1 Aug. 12, 2021

(30) Foreign Application Priority Data

Mar. 5, 2021 (CN) .......................... 202110244678.4

(51) Int. Cl.
*G06T 17/00* (2006.01)
*G06T 15/20* (2011.01)
(Continued)

(52) U.S. Cl.
CPC ............ *G06T 17/00* (2013.01); *G06F 18/213* (2023.01); *G06F 18/217* (2023.01); *G06N 3/04* (2013.01);
(Continued)

(58) Field of Classification Search
None
See application file for complete search history.

(56) References Cited

U.S. PATENT DOCUMENTS

2022/0270341 A1* 8/2022 Kim ...................... G06V 10/26

FOREIGN PATENT DOCUMENTS

WO WO-2022096105 A1 * 5/2022

OTHER PUBLICATIONS

X. Gao, W. Hu and Z. Guo, "Exploring Structure-Adaptive Graph Learning for Robust Semi-Supervised Classification," 2020 IEEE International Conference on Multimedia and Expo (ICME), London, UK, 2020, pp. 1-6.*
Yasutaka Furukawa and Jean Ponce. Accurate, dense, and robust multiview stereopsis. IEEE transactions on pattern analysis and machine intelligence, vol. 32, Issue 8, pp. 1362-1376, Aug. 2010.
(Continued)

*Primary Examiner* — Aaron M Richer
(74) *Attorney, Agent, or Firm* — Yue (Robert) Xu; Apex Attorneys at Law, LLP (57) ABSTRACT

The present invention provides a method for reconstructing a 3D object based on dynamic graph network, first, obtaining a plurality of feature vectors from 2D image I of an object; then, preparing input data: predefining an initial ellipsoid mesh, obtaining a feature input X by filling initial features and creating a relationship matrix A corresponding to the feature input X; then, inputting the feature input X and corresponding relationship matrix A to a dynamic graph network for integrating and deducing of each vertex's feature, thus new relationship matrix is obtained and used for the later graph convoluting, which improves the initial graph information and makes the initial graph information adapted to the mesh relation of the corresponding object, therefore the accuracy and the effect of 3D object reconstruction have been improved; last, regressing the position, thus the 3D structure of the object is deduced, and the 3D object reconstruction is completed.

2 Claims, 3 Drawing Sheets

(51) Int. Cl.
- *G06N 3/04* (2023.01)
- *G06N 3/08* (2023.01)
- *G06V 10/82* (2022.01)
- *G06F 18/213* (2023.01)
- *G06F 18/21* (2023.01)
- *G06V 10/764* (2022.01)
- *G06V 10/84* (2022.01)
- *G06V 20/64* (2022.01)

(52) U.S. Cl.
CPC ............ *G06N 3/08* (2013.01); *G06T 15/205* (2013.01); *G06V 10/764* (2022.01); *G06V 10/82* (2022.01); *G06V 10/84* (2022.01); *G06V 20/64* (2022.01); *G06T 2210/22* (2013.01)

(56) References Cited

OTHER PUBLICATIONS

Maxim Tatarchenko, Alexey Dosovitskiy, and Thomas Brox. Octree generating networks: Efficient convolutional architectures for high-resolution 3d outputs. In Proceedings of the IEEE International Conference on Computer Vision, pp. 2088-2096, 2017.

Charles R Qi, Hao Su, Kaichun Mo, and Leonidas J Guibas. Pointnet: Deep learning on point sets for 3d classification and segmentation. In Proceedings of the IEEE Conference on Computer Vision and Pattern Recognition, pp. 652-660, 2017.

Nanyang Wang, Yinda Zhang, Zhuwen Li, Yanwei Fu, Wei Liu, and Yu-Gang Jiang. Pixel2mesh: Generating 3d mesh models from single rgb images. In Proceedings of the European Conference on Computer Vision (ECCV), pp. 52-67, 2018.

* cited by examiner

METHOD FOR RECONSTRUCTING A 3D OBJECT BASED ON DYNAMIC GRAPH NETWORK

FIELD OF THE INVENTION

This application claims priority under the Paris Convention to Chinese Patent Application No. 202110244678.4, filed on Mar. 5, 2021, the entirety of which is hereby incorporated by reference for all purposes as if fully set forth herein.

The present invention relates to the field of 3D object reconstruction, more particularly to a method for reconstructing a 3D object based on dynamic graph network.

BACKGROUND OF THE INVENTION

The purpose of 3D object reconstruction is to deduce a 3D structure from the 2d image(s) of an object. In prior art, the method for reconstructing a 3D object is a 3D structure deduction process based on the angular relations of multi-views of the object, for example, accurate, dense, and robust multiview stereopsis, Yasutaka Furukawa and Jean Ponce, IEEE transactions on pattern analysis and machine intelligence, 32(8):1362-1376, 2010. The method for reconstructing a 3D object can realize a high quality 3D objection reconstruction. However, it cannot be applied to the 3D object reconstruction of single 2D image due to the limits of professional equipment and complete multi-view data.

Figure 1:
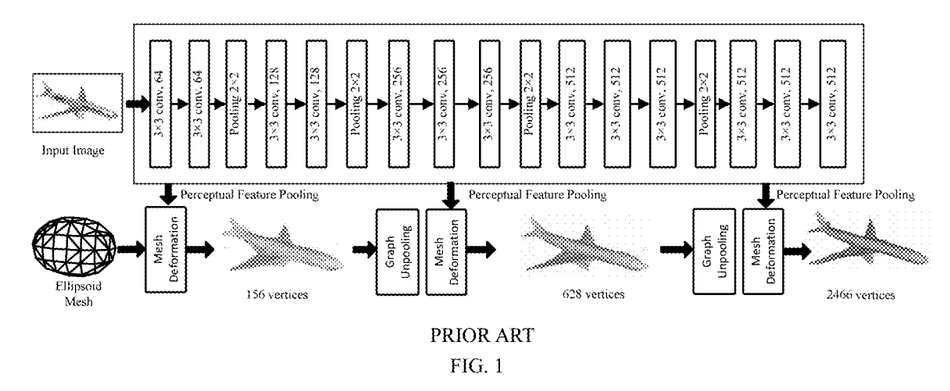
FIG. 1 is a diagram of an end-to-end deep learning architecture using for 3D object reconstruction in prior art.

Recently, Nanyang, Wang, et al. have proposed a method for reconstructing a 3D object from a single 2D image, in which a 3D model based on a mesh expression is reconstructed from the single 2D image by building an end-to-end deep learning architecture. For more detailed description, see Pixel2mesh: generating 3d mesh models from single rgb images. Nanyang Wang, Yinda Zhang, Zhuwen Li, Yanwei Fu, Wei Liu, and Yu-Gang Jiang, In Proceedings of the European Conference on Computer Vision (ECCV), pages 52-67, 2018. As shown in FIG. 1, the method for reconstructing a 3D object is based on graph convolutional neural network, in which a correct geometric shape, i.e. 3D structure is generated through gradually deforming an initial ellipsoid. However, in the method for reconstructing a 3D object, the initial relationship matrix used in the graph convolutional neural network lacks necessary neighbor nodes information, i.e. initial graph information is not complete, which causes that the initial relationship matrix can't be adapted to the mesh relation of the corresponding object, limiting the desired effect of deduction.

SUMMARY OF THE INVENTION

The present invention aims to overcome the deficiencies of the prior art and provides a method for reconstructing a 3D object based on dynamic graph network to adapt to the mesh relation of the corresponding object by completing the initial graph information of graph convolutional neural network, so as to improve the accuracy and the effect of 3D object reconstruction.

To achieve these objectives, in accordance with the present invention, a method for reconstructing a 3D object based on dynamic graph network is provided, comprising:

(1) image feature extraction extracting image features from 2D (2 dimensional) image I of an object, wherein the extracted image features constitute a feature map, the feature map comprises N feature vectors of D dimensions and N center coordinates of the image areas respectively corresponding to the N feature vectors, N feature vectors are denoted by $F_n$, n=1, 2, ..., N, feature vector $F_n$ is a column vector, and the center coordinate of the image area corresponding to feature vector $F_n$ is denoted by $(x_n, y_n)$, the center coordinate $(x_n, y_n)$ is taken as the feature vector coordinate of feature vector $F_n$, where $x_n$ is the horizontal coordinate of the feature vector coordinate, $x_n$ is the vertical coordinate of the feature vector coordinate;

(2): input data preparation for dynamic graph network predefining an initial ellipsoid mesh, which comprises N vertices and a plurality of edges, where the coordinate of the $k^{th}$ vertex is $(x'_k, y'_k, z'_k)$, $x'_k, y'_k, z'_k$ respectively are the x coordinate, y coordinate and z coordinate of the $k^{th}$ vertex;

filling initial features: in the feature map, finding feature vector coordinate $(x_{k'}, y_{k'})$, $k' \in \{1, 2, ... N\}$, which has the nearest distance from its coordinate $(x'_k, y'_k)$, and combining feature vector $F_{k'}$ and coordinate $(x'_k, y'_k, z'_k)$ of the $k^{th}$ vertex into a feature vector, which is denoted by $X_k$, where the number of dimensions of feature vector $X_k$ is $c_1$, $c_1 = D+3$, and a feature input X is obtained, $X = \{X_1, X_2, ..., X_N\}$;

creating a relationship matrix corresponding to the feature input X, which is denoted by A and $A=(A_{ij})_{N \times N}$ wherein if there is a edge connecting the $i^{th}$ vertex and the $j^{th}$ vertex, or neighborhood relationship exists between the $i^{th}$ vertex and the $j^{th}$ vertex (the distance of the $i^{th}$ vertex and the $j^{th}$ vertex is less than set threshold ε), element $A_{ij}=1$, otherwise, element $A_{ij}=0$;

(3): feature mapping and convolution in a dynamic graph network the dynamic graph network (dynamic graph convolutional neural network) comprises a dynamic graph learning layer and two graph convolution layers;

3.1): in the dynamic graph learning layer, first performing a feature mapping for feature input X by a learnable parameter θ, for the $i^{th}$ feature vector $X_i$ of feature input X, the feature vector $h_i$ is obtained: $h_i = \theta^T X_i$, where the learnable parameter θ is a matrix with size of $c_1 \times c_2$, $c_2$ is the number of dimensions in distance space; then measuring the distances between vertices, and a relationship matrix is obtained, which is denoted by S, $S=(S_{ij})_{N \times N}$, element $S_{ij}$ of relationship matrix S is:

$$S_{ij} = \frac{\exp\{-d^2(\theta^T X_i, \theta^T X_j)\}}{\sum_{n=1}^{N} \exp\{-d^2(\theta^T X_i, \theta^T X_n)\}};$$

where $d^2(\ )$ is a distance measure function used to calculate the distance between two feature vectors, $\exp\{\ \}$ is an exponential function;

then normalizing relationship matrix S, where the normalized element $\overline{S}_{ij}$ is:

$$\overline{S}_{ij} = \frac{S_{ij}}{\sum_{n=1}^{N} S_{in}};$$

to N elements $\overline{S}_{i1}, \overline{S}_{i2}, ..., \overline{S}_{iN}$ of the $i^{th}$ row, retaining the K largest elements, and setting the remaining elements to 0, thus a relationship matrix denoted by $\overline{S}$ is obtained by the retaining and setting of the N rows, where $\overline{S}=(\overline{S}_{ij})_{N \times N}$;

last, integrating relationship matrix $\bar{S}$ with relationship matrix A into new relationship matrix $\hat{A}$:

$$\hat{A}=(1-\eta)A+\eta\bar{S};$$

where η is a hyper-parameter used to balance relationship matrix A and relationship matrix $\bar{S}$, its value is determined according to specific implementation;

3.2): in the two graph convolution layers, performing two graph convolutions for feature input X, thus a feature output denoted by Z is obtained according to the following equation:

$$Z=\sigma(\hat{A}\sigma(\hat{A}XW^{(1)})W^{(2)});$$

where feature output Z is a matrix consisted of N columns of vectors, $\sigma(\hat{A}XW^{(1)})$ is the output of the first graph convolution layer, and taken as the input of the second graph convolution layer, $W^{(1)}$ is the learnable linear parameter of the first graph convolution layer, $W^{(2)}$ is the learnable linear parameter of the second graph convolution layer, σ( ) is a activation function;

(4): linear regression mapping in 3D coordinate regression layer sending the N column vectors $Z_i$, i=1, 2, . . . , N, of feature output Z as input to a 3D coordinate regression layer to perform linear regression mapping, wherein the 3D coordinate regression layer outputs 3 dimensional coordinate vectors $P_i$, i=1, 2, . . . , N, which respectively correspond to the predicted 3D coordinates of the N vertices;

(5): dynamic graph network training 5.1): creating a graph learning loss function $L_{graph}$:

$$L_{graph} = \left(\sum_{i=1}^{N}\sum_{j=1}^{N}|Z_i - Z_j|^2 S_{ij} + \|S - A\|_F^2\right);$$

where $Z_i$, $Z_j$ are respectively the $i^{th}$, $j^{th}$ column vectors of feature output Z, $|Z_i-Z_j|$ means calculate the Euclidean distance between the $i^{th}$, $j^{th}$ column vectors, $\|S-A\|_F$ means calculate the norm of S−A;

5.2): continuously inputting 2D image I of different object, and processing it according to step (1), (2) and (3), then updating learnable parameter θ of the dynamic graph learning layer and learnable linear parameter $W^{(1)}$, $W^{(2)}$ of the two graph convolution layers by adopting gradient decent algorithm to perform a back propagation according to graph learning loss function $L_{graph}$, until the decrease of the value of graph learning loss function $L_{graph}$ stops (the value of graph learning loss function $L_{graph}$ converges to a stable value), at this time, the dynamic graph network training is completed;

(6): graph convolution layer training after the dynamic graph network training is complete, continuously inputting 2D image I of different object, and processing it according to step (1), (2), (3) and (4), then updating the network parameters of the 3D coordinate regression layer by measuring the distance between the predicted 3D coordinates and the true 3D coordinates of the N vertices and adopting gradient decent algorithm to perform a back propagation according to Chamfer distance loss function, until the decrease of the value of Chamfer distance loss function stops (the value of Chamfer distance loss function converges to a stable value), at this time, the 3D coordinate regression layer training is completed;

(7): 3D object reconstruction after the dynamic graph network training and the graph convolution layer training are completed, to 2D image I of an object, obtaining the predicted 3D coordinates of the N vertices by processing it according to (1), (2), (3) and (4), thus the 3D structure of the object is deduced, the 3D object reconstruction is completed.

The objectives of the present invention are realized as follows:

In the present invention i.e. a method for reconstructing a 3D object based on dynamic graph network, first, obtaining a plurality of feature vectors by extracting image features from 2D (2 dimensional) image I of an object; then, preparing input data for dynamic graph network: predefining an initial ellipsoid mesh, which comprises N vertices and a plurality of edges, obtaining a feature input X by filling initial features and creating a relationship matrix A corresponding to the feature input X; then, inputting the feature input X and corresponding relationship matrix A to a dynamic graph network for integrating and deducing of each vertex's feature, thus new relationship matrix Â is obtained and used for the later graph convoluting, which improves the initial graph information and makes the initial graph information adapted to the mesh relation of the corresponding object, therefore the accuracy and the effect of 3D object reconstruction have been improved; last, regressing the position, i.e. the predicted 3D coordinate of each vertex by a 3D coordinate regression layer according to feature output Z. Namely, for a given 2D (2 dimensional) image I of an object, the present invention can output corresponding the predicted 3D coordinates of the N vertices, thus the 3D structure of the object is deduced, the 3D object reconstruction is completed.

BRIEF DESCRIPTION OF THE DRAWING

The above and other objectives, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

Embodiment

Figure 2:
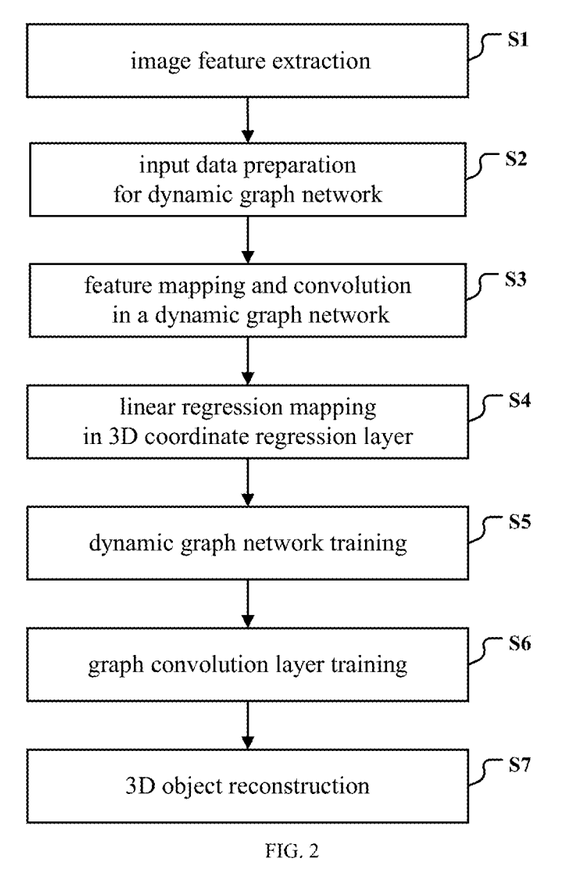
FIG. 2 is a flow diagram of a method for reconstructing a 3D object based on dynamic graph network in accordance with the present invention.

FIG. 2 is a flow diagram of a method for reconstructing a 3D object based on dynamic graph network in accordance with the present invention.

In one embodiment, As shown in FIG. 2, a method for reconstructing a 3D object based on dynamic graph network is provided, comprising comprises the following steps:

Step S1: image feature extraction

Extracting image features from 2D (2 dimensional) image I of an object, wherein the extracted image features constitute a feature map, the feature map comprises N feature vectors of D dimensions and N center coordinates of the image areas respectively corresponding to the N feature vectors, N feature vectors are denoted by $F_n$, n=1, 2, ..., N, feature vector $F_n$ is a column vector, and the center coordinate of the image area corresponding to feature vector $F_n$ is denoted by $(x_n, y_n)$, the center coordinate $(x_n, y_n)$ is taken as the feature vector coordinate of feature vector $F_n$, where $x_n$ is the horizontal coordinate of the feature vector coordinate, $x_n$ is the vertical coordinate of the feature vector coordinate.

In the embodiment, 2D (2 dimensional) image I of an object is needed to be processed before performing the image feature extraction: enhance, crop and uniform 2D image I. The detailed cropping and unifying are as follows: ① cropping 2D image I into a image with fixed size 256×256, and removing the color of background area by edge detection algorithm, filling the background area with green color; ② normalizing 2D image I to uniform the pixel values, which make the pixel values conform to Gaussian distribution.

In the embodiment, pre-processed 2D (2 dimensional) image I is sent to a ResNet50 model of residual network that has been trained using ImageNet image database for image feature extraction. The ResNet50 model comprises multiple 3×3 convolutional layers, activation function layers and batch normalization layers, and also contains short-circuit connections to connect the upper layer features to the lower layer features. The ResNet50 model usually consists of multiple blocks. However, in the embodiment, the last block in order has been removed to obtain feature vectors corresponding to image areas of 2D image I. then a feature map constituted by N=16×16 feature vectors with the size of D=512 dimensions is obtained. Namely, the feature map comprises 256 feature vectors $F_1, F_2, ..., F_{256}$ with the size of 512 dimensions and 512 center coordinates of the image areas respectively corresponding to the 512 feature vectors.

Step S2: input data preparation for dynamic graph network

Figure 3:
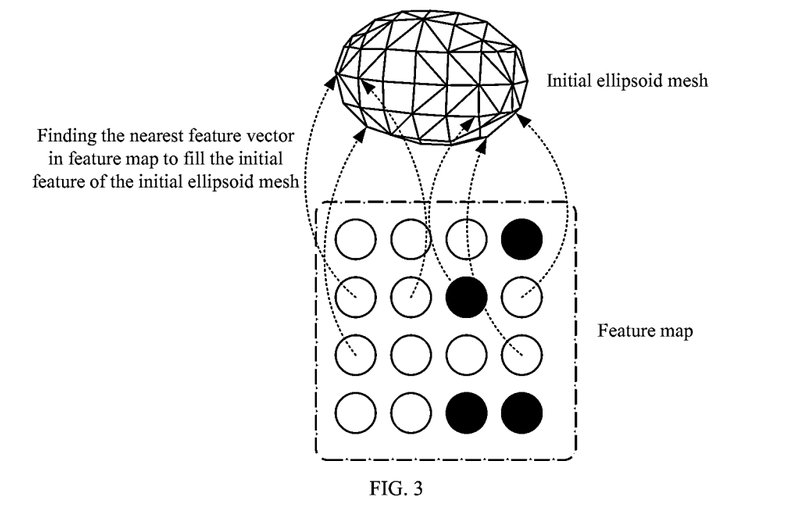
FIG. 3 is a diagram of the input data preparation for dynamic graph network shown in FIG. 2.

As shown in FIG. 3, predefining an initial ellipsoid mesh, which comprises N vertices and a plurality of edges, where the coordinate of the $K^{th}$ vertex is $(x'_k, y'_k, z'_k)$, $x'_k, y'_k, z'_k$ respectively are the x coordinate, y coordinate and z coordinate of the $k^{th}$ vertex.

Filling initial features: in the feature map, finding feature vector coordinate $(x_{k'}, y_{k'})$, $k' \in \{1, 2, ... N\}$, which has the nearest distance from its coordinate $(x'_k, y'_k)$, and combining feature vector $F_{k'}$ and coordinate $(x'_k, y'_k, z'_k)$ of the $k^{th}$ vertex into a feature vector, which is denoted by $X_k$, where the number of dimensions of feature vector $X_k$ is $c_1$, $c_1$=D+3, and a feature input X is obtained, X={$X_1, X_2, ..., X_N$}. In the embodiment, $c_1$=512+3=515.

Creating a relationship matrix corresponding to the feature input X, which is denoted by A and A=$(A_{ij})_{N \times N}$; wherein if there is a edge connecting the $i^{th}$ vertex and the $j^{th}$ vertex, or neighborhood relationship exists between the $i^{th}$ vertex and the $j^{th}$ vertex (the distance of the $i^{th}$ vertex and the $j^{th}$ vertex is less than set threshold ε), element $A_{ij}$=1, otherwise, element $A_{ij}$=0.

In the embodiment, the initial ellipsoid mesh comprises 256 vertices and 6×16 edges.

Step S3: feature mapping and convolution in a dynamic graph network

The dynamic graph network (dynamic graph convolutional neural network) comprises a dynamic graph learning layer and two graph convolution layers.

Step S3.1: in the dynamic graph learning layer, first performing a feature mapping for feature input X by a learnable parameter θ, for the $i^{th}$ feature vector $X_i$ of feature input X, the feature vector $h_i$ is obtained: $h_i = \theta^T X_i$, where the learnable parameter θ is a matrix with size of $c_1 \times c_2$, $c_2$ is the number of dimensions in distance space; then measuring the distances between vertices, and a relationship matrix is obtained, which is denoted by S, S=$(S_{ij})_{N \times N}$, element $S_{ij}$ of relationship matrix S is:

$$S_{ij} = \frac{\exp\{-d^2(\theta^T X_i, \theta^T X_j)\}}{\sum_{n=1}^{N} \exp\{-d^2(\theta^T X_i, \theta^T X_n)\}};$$

where $d^2(\ )$ is a distance measure function used to calculate the distance between two feature vectors, exp{ } is an exponential function.

Then normalizing relationship matrix S, where the normalized element $\overline{S}_{ij}$ is:

$$\overline{S}_{ij} = \frac{S_{ij}}{\sum_{n=1}^{N} S_{in}}.$$

To N elements $\overline{S}_{i1}, \overline{S}_{i2}, ..., \overline{S}_{iN}$ of the $i^{th}$ row, retaining the K largest elements, and setting the remaining elements to 0, thus a relationship matrix denoted by $\overline{S}$ is obtained by the retaining and setting of the N rows, where $\overline{S} = (\overline{S}_{ij})_{N \times N}$.

To each vertex, too many neighbor nodes will cause graph over-smoothing problem during feature aggregation, making all nodes' features tend to be the same, which can lead to network training failure. So the present invention makes relationship matrix $\overline{S}$ sparse: normalize the weight of each neighbor vertex, retain the K nearest vertices, and discard the remaining links.

Last, integrating relationship matrix $\overline{S}$ with relationship matrix A into new relationship matrix $\hat{A}$:

$$\hat{A} = (1-\eta)A + \eta\overline{S};$$

where η is a hyper-parameter used to balance relationship matrix A and relationship matrix $\overline{S}$, its value is determined according to specific implementation.

Step S3.2: in the two graph convolution layers, performing two graph convolutions for feature input X, thus a feature output denoted by Z is obtained according to the following equation:

$$Z = \sigma(\hat{A}\sigma(\hat{A}XW^{(1)})W^{(2)});$$

where feature output Z is a matrix consisted of N columns of vectors, $\sigma(\hat{A}XW^{(1)})$ is the output of the first graph convolution layer, and taken as the input of the second graph convolution layer, $W^{(1)}$ is the learnable linear parameter of the first graph convolution layer, $W^{(2)}$ is the learnable linear parameter of the second graph convolution layer, $\sigma(\ )$ is a activation function.

where multiplying feature input X with learnable linear parameter $W^{(1)}$ is a linear mapping, and multiplying feature input X with relationship matrix Â is a feature aggregation of neighbor vertices.

Step S4: linear regression mapping in 3D coordinate regression layer

Sending the N column vectors $Z_i$, i=1, 2, ..., N, of feature output Z as input to a 3D coordinate regression layer to perform linear regression mapping, wherein the 3D coordinate regression layer outputs 3 dimensional coordinate vectors $P_i$, i=1, 2, ..., N, which respectively correspond to the predicted 3D coordinates of the N vertices.

Step S5: dynamic graph network training

Step S5.1: creating a graph learning loss function $L_{graph}$:

$$L_{graph} = \left( \sum_{i=1}^{N} \sum_{j=1}^{N} |Z_i - Z_j|^2 S_{ij} + \|S - A\|_F^2 \right);$$

where $Z_i$, $Z_j$ are respectively the $i^{th}$, $j^{th}$ column vectors of feature output Z, $|Z_i - Z_j|$ means calculate the Euclidean distance between the $i^{th}$, $j^{th}$ column vectors, $\|S-A\|_F$ means calculate the norm of S−A.

Step S5.2: continuously inputting 2D image I of different object, and processing it according to step S1, S2 and S3, then updating learnable parameter θ of the dynamic graph learning layer and learnable linear parameter $W^{(1)}$, $W^{(2)}$ of the two graph convolution layers by adopting gradient decent algorithm to perform a back propagation according to graph learning loss function $L_{graph}$, until the decrease of the value of graph learning loss function $L_{graph}$ stops (the value of graph learning loss function $L_{graph}$ converges to a stable value), at this time, the dynamic graph network training is completed.

The traditional graph network (graph convolutional neural network) requires the feature input X and the corresponding initial relationship matrix A to be inputted, and initial relationship matrix A is used as the operational input for feature aggregation. But relationship matrix A is constant and fixed throughout the process, which means that initial relationship matrix A has a great influence on the feature transfer and aggregation process. However, initial relationship matrix A has the disadvantage of incomplete information (e.g., missing edges) as well as not corresponding well to the grid relationship with the mesh, so the present invention provides a method for reconstructing a 3D object based on dynamic graph network. Unlike the traditional 3D reconstruction based on graph convolutional neural network, the dynamic graph network will map the feature of each vertex and update the edges of the graph based on graph Laplacian regularization to discover the potential edge relationships, and after distance calculation based on Gaussian kernel function and sparsification of the generated potential graph, finally integrate relationship matrix $\bar{S}$ with initial relationship matrix A into new relationship matrix Â for later the graph convolution operation. Compared with initial relationship matrix A, new relationship matrix Â improves the incomplete initial graph information of initial relationship matrix A, and can be better adapted to the mesh relationship with the corresponding object, thus the accuracy and effectiveness of the reconstruction are improved.

Step S6: graph convolution layer training

After the dynamic graph network training is complete, continuously inputting 2D image I of different object, and processing it according to step S1, S2, S3 and S4, then updating the network parameters of the 3D coordinate regression layer by measuring the distance between the predicted 3D coordinates and the true 3D coordinates of the N vertices and adopting gradient decent algorithm to perform a back propagation according to Chamfer distance loss function, until the decrease of the value of Chamfer distance loss function stops (the value of Chamfer distance loss function converges to a stable value), at this time, the 3D coordinate regression layer training is completed.

Chamfer distance loss function is used to measure the distance between the predicted value and true value, its expression is:

$$L = \sum_{p \in M} \min_q |p - q|^2 + \sum_{q \in G} \min_p |p - q|^2;$$

where M is the set of predicted vertices, G is the set of true vertices. To each vertex in a vertex set, Chamfer distance loss function means finding a nearest vertex in another vertex set, then adding all squares of the distances between vertices and their respective nearest vertices. The first item means the sum of the distances between each vertex p in the predicted vertex set and its nearest vertex in the true vertex set; the first item means the sum of the distances between each vertex q in the true vertex set and its nearest vertex in tjen predicted vertex set. If distance L is bigger, it means that the difference between the predicted vertex set and the true vertex set is bigger; If distance L is smaller, it means that the difference between the predicted vertex set and the true vertex set is smaller, the effect of 3D object reconstruction is better. Chamfer distance is mainly used for point cloud reconstruction or 3D reconstruction work.

In the embodiment, Chamfer distance loss function is denoted by $L_{regress}$:

$$L_{regress} = \sum_{i=1}^{N} |P_i - Q_{i*}|^2 + \sum_{i=1}^{N} |P_{i'} - Q_i|^2;$$

where $Q_{i*}$ is the nearest coordinate vector constituted by the true 3D coordinate to the $i^{th}$ coordinate vector $P_i$. $P_{i'}$ is the nearest coordinate vector to coordinate vector $Q_i$ corresponding to the true 3D coordinate of the $i^{th}$ vertex, coordinate vector $Q_i$ is constituted by the true 3D coordinate of the $i_{th}$ vertex.

Step S7: 3D object reconstruction

Figure 4:
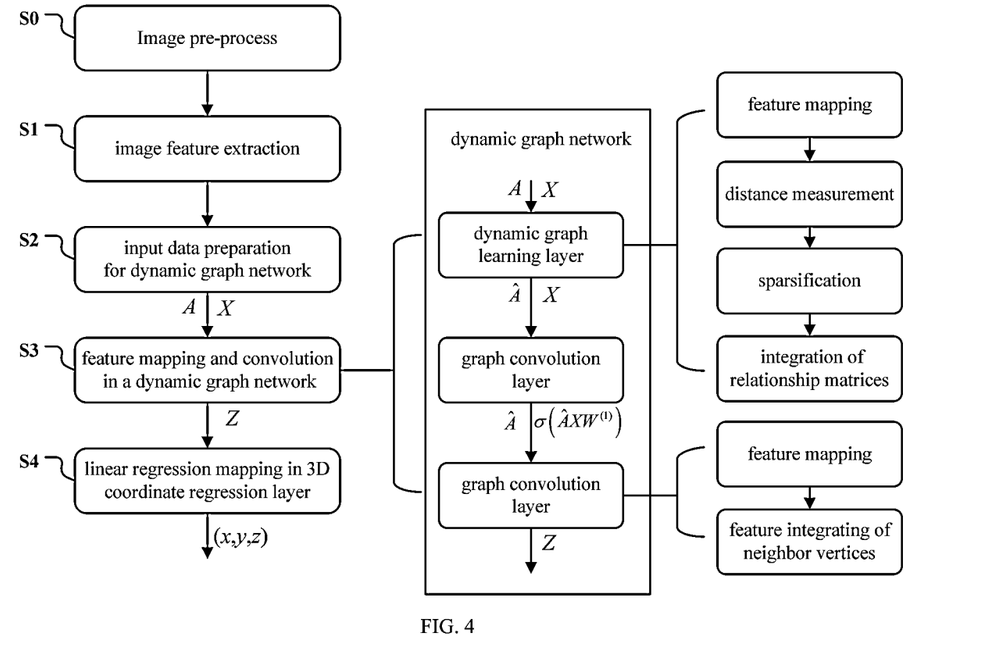
FIG. 4 is a flow diagram of the 3D object reconstruction shown in FIG. 2.
Figure 5:
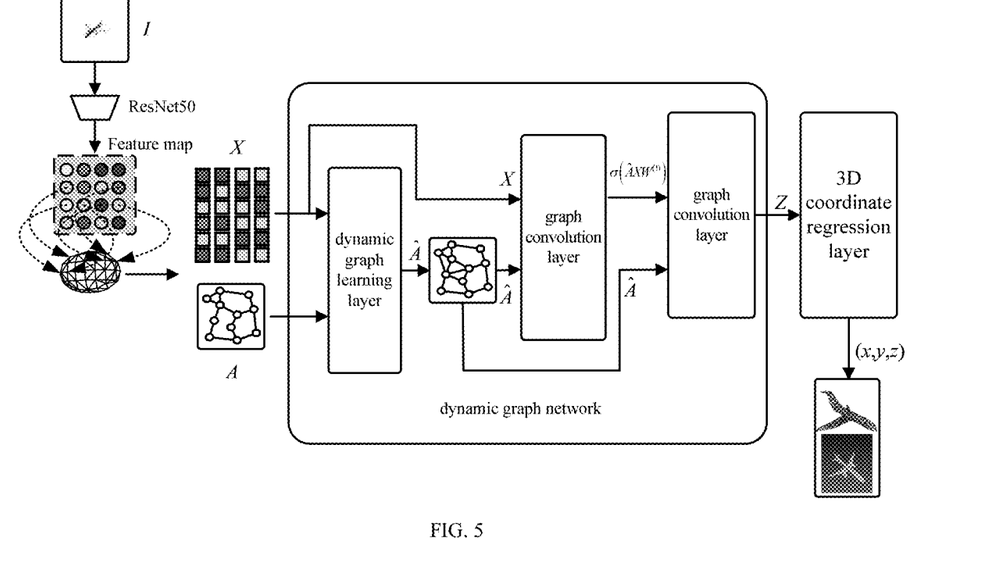
FIG. 5 is a diagram of the 3D object reconstruction shown in FIG. 2.

As shown in FIG. 4, FIG. 5, after the dynamic graph network training and the graph convolution layer training are completed, to 2D image I of an object, obtaining the predicted 3D coordinates of the N vertices by processing it according to S0, S1, S2, S3 and S4: image pre-processing, image feature extraction, image feature extraction, input data preparation for dynamic graph network, feature mapping and convolution in a dynamic graph network and linear regression mapping in 3D coordinate regression layer, thus the 3D structure of the object is deduced, the 3D object reconstruction is completed.

As shown in FIG. 4, the dynamic graph network comprises a dynamic graph learning layer and two graph convolution layers. Feature mapping, distance measurement, sparsification and integration of relationship matrices are performed in the dynamic graph learning layer, and the new relationship matrix Â is obtained, namely, the potential edges are found by learning; Feature mapping and feature integrating of neighbor vertices are performed in the two graph convolution layers, and feature output Z is obtained. Detailed diagram of the 3D object reconstruction is shown in FIG. 5.

Figure 6:
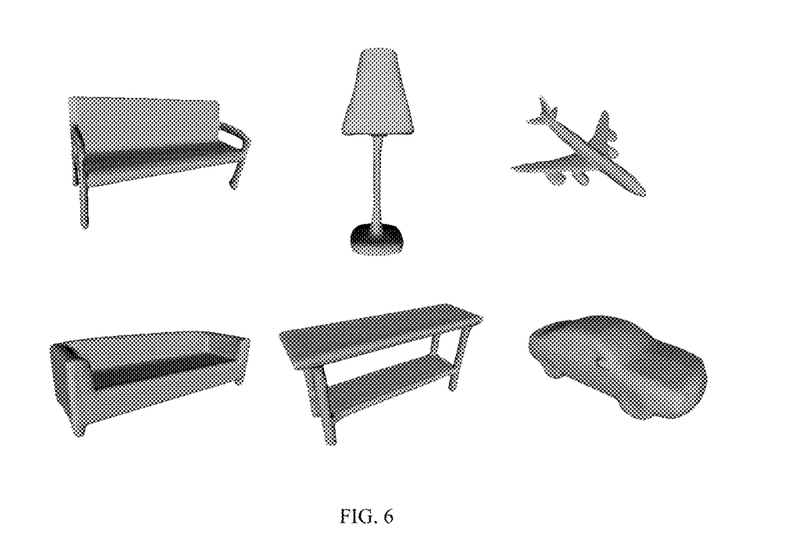
FIG. 6 shows six 3D renderings reconstructed in accordance with the present invention.

In the embodiment, 2D images of six objects are respectively taken as 2D image I to be processed in accordance with the present invention, then the 3D structures of the six objects are deduced. The 3D structures of the six objects are converted into six 3D renderings, which are shown in FIG. 6. As can be seen from FIG. 6, the 3D structure reconstructed has the characteristics of completeness and smoothness, and can be applied to various practical applications such as game, drone and animations.

While illustrative embodiments of the invention have been described above, it is, of course, understand that various modifications will be apparent to those of ordinary skill in the art. Such modifications are within the spirit and scope of the invention, which is limited and defined only by the appended claims.

What is claimed is:

1. A method for reconstructing a 3D object based on a dynamic graph network, comprising:

(1): image feature extraction, comprising:

extracting image features from a 2D (2 dimensional) image I of an object, wherein the extracted image features constitute a feature map, and the feature map comprises N feature vectors of D dimensions and N center coordinates of the image areas respectively corresponding to the N feature vectors, where N and D are natural numbers, N feature vectors are denoted by $F_n$, n=1, 2, ..., N, feature vector $F_n$ is a column vector, and the center coordinate of the image area corresponding to feature vector $F_n$ is denoted by $(x_n, y_n)$, the center coordinate $(x_n, y_n)$ is taken as the feature vector coordinate of feature vector $F_n$, where $x_n$ is the horizontal coordinate of the feature vector coordinate, $y_n$ is the vertical coordinate of the feature vector coordinate;

(2): input data preparation for a dynamic graph network, comprising:— predefining an initial ellipsoid mesh, which comprises N vertices and a plurality of edges, where the coordinate of the $k^{th}$ vertex is $(x'_k, y'_k, z'_k)$, $x'_k, y'_k, z'_k$ respectively are the x coordinate, y coordinate and z coordinate of the $k^{th}$ vertex, where k=1, 2, ..., N;

filling initial features: in the feature map, finding feature vector coordinate $(x_{k'}, y_{k'})$, k'∈{1, 2, ... N}, which has the nearest distance from the coordinate $(x'_k, y'_k)$ of the $k^{th}$ vertex, and combining feature vector $F_{k'}$ and coordinate $(x'_k, y'_k, z'_k)$ of the $k^{th}$ vertex into a feature vector, which is denoted by $X_k$, where the number of dimensions of feature vector $X_k$ is $c_1$, $c_1$=D+3, and a feature input X is obtained, X={$X_1, X_2, ..., X_N$};

creating a relationship matrix corresponding to the feature input X, which is denoted by A and A=$(A_{ij})_{N \times N}$, i=1, 2, ..., N, j=1, 2, ..., N; wherein if there is an edge connecting the $i^{th}$ vertex and the $j^{th}$ vertex, or a neighborhood relationship exists between the $i^{th}$ vertex and the $j^{th}$ vertex, element $A_{ij}$=1, otherwise, element $A_{ij}$=0;

(3): feature mapping and convolution in a dynamic graph network, wherein the dynamic graph network (dynamic graph convolutional neural network) comprises a dynamic graph learning layer and two graph convolution layers, comprising:

3.1): in the dynamic graph learning layer, first performing a feature mapping for feature input X by a learnable parameter θ, for the $i^{th}$ feature vector $X_i$ of feature input X, the feature vector $h_i$ is obtained: $h_i = \theta^T X_i$, where the learnable parameter θ is a matrix with size of $c_1 \times c_2$, $c_2$ is a natural number; then measuring the distances between vertex $\theta^T X_i$ and vertex $\theta^T X_j$, and obtaining a relationship matrix, which is denoted by S, S=$(S_{ij})_{N \times N}$, element $S_{ij}$ of relationship matrix S is:

$$S_{ij} = \frac{\exp\{-d^2(\theta^T X_i, \theta^T X_j)\}}{\sum_{n=1}^{N} \exp\{-d^2(\theta^T X_i, \theta^T X_n)\}};$$

where $d^2()$ is a distance measure function used to calculate the distance between two feature vectors, and exp{ } is an exponential function;

then normalizing relationship matrix S, where the normalized element $\overline{S}_{ij}$ is:

$$\overline{S}_{ij} = \frac{S_{ij}}{\sum_{n=1}^{N} S_{in}};$$

retaining the K largest elements of the N elements $\overline{S}_{i1}, \overline{S}_{i2}, ..., \overline{S}_{iN}$ of the $i^{th}$ row, and setting the remaining elements of the $i^{th}$ row to 0, thus a relationship matrix denoted by $\overline{\overline{S}}$ is obtained by the retaining and setting of the N rows, where $\overline{\overline{S}}=(\overline{\overline{S}}_{ij})_{N \times N}$, where K is a natural number less than N;

last, integrating relationship matrix $\overline{\overline{S}}$ with relationship matrix A into new relationship matrix Â:

$$Â=(1-\eta)A+\eta \overline{\overline{S}};$$

where η is a hyper-parameter used to balance relationship matrix A and relationship matrix $\overline{\overline{S}}$, η is a decimal less than 1;

3.2): in the two graph convolution layers, performing two graph convolutions for feature input X, thus a feature output denoted by Z is obtained according to the following equation:

$$Z=\sigma(Â\sigma(ÂXW^{(1)})W^{(2)});$$

where feature output Z is a matrix consisted of N columns of vectors, $\sigma(ÂXW^{(1)})$ is the output of the first graph convolution layer, and taken as the input of the second graph convolution layer, $W^{(1)}$ is a learnable linear parameter of the first graph convolution layer, $W^{(2)}$ is a learnable linear parameter of the second graph convolution layer, σ( ) is an activation function;

(4): linear regression mapping in a 3D coordinate regression layer, comprising:

sending the N column vectors $Z_i$, $Z_i$=1, 2, ..., N, of feature output Z as input to a 3D coordinate regression layer to perform linear regression mapping, wherein the 3D coordinate regression layer outputs 3 dimensional coordinate vectors $P_i$, i=1, 2, ..., N, which respectively correspond to the predicted 3D coordinates of the N vertices;

(5): dynamic graph network training, comprising:

5.1): creating a graph learning loss function $L_{graph}$:

$$L_{graph} = \left( \sum_{i=1}^{N} \sum_{j=1}^{N} |Z_i - Z_j|^2 S_{ij} + \|S - A\|_F^2 \right);$$

where $Z_i$, $Z_j$ are respectively the $i^{th}$, $j^{th}$ column vectors of feature output Z, $|Z_i-Z_j|$ means calculate the Euclidean distance between the $i^{th}$, $j^{th}$ column vectors, $\|S-A\|_F$ means calculate the norm of S−A;

5.2): continuously inputting a 2D image I of a different object, and processing the 2D image I according to step (1), (2) and (3), then updating learnable parameter θ of the dynamic graph learning layer and learnable linear parameters $W^{(1)}$, $W^{(2)}$ of the two graph convolution layers by adopting a gradient decent algorithm to perform a back propagation according to graph learning loss function $L_{graph}$, until the decrease of the value of graph learning loss function $L_{graph}$ stops, completing the dynamic graph network training;

(6): graph convolution layer training, comprising:

after the dynamic graph network training is complete, continuously inputting a 2D image I of a different object, and processing the 2D image I according to step (1), (2), (3) and (4), then updating the network parameters of the 3D coordinate regression layer by measuring the distance between the predicted 3D coordinates and the true 3D coordinates of the N vertices and adopting a gradient decent algorithm to perform a back propagation according to a Chamfer distance loss function, until the decrease of the value of the Chamfer distance loss function stops, completing the 3D coordinate regression layer training;

(7): 3D object reconstruction, comprising:

after the dynamic graph network training and the graph convolution layer training are completed, inputting a 2D image I of an object, obtaining the predicted 3D coordinates of the N vertices by processing the 2D image I according to (1), (2), (3) and (4), thus the 3D structure of the object is deduced, and the 3D object reconstruction is completed.

2. The method for reconstructing a 3D object based on the dynamic graph network of claim 1, further comprising pre-processing 2D image I before the image feature extraction, including enhancing, cropping and making uniform 2D image I, and a detailed cropping and unifying are as follows: ① cropping 2D image I into an image with fixed size 256×256, removing the color of a background area by using an edge detection algorithm, and filling the background area with green color; ② normalizing 2D image I to make the pixel values uniform, wherein the normalizing makes the pixel values conform to Gaussian distribution.

* * * * *